(No Model.)

E. L. LIEDKE.
BELT JOINT.

No. 277,909. Patented May 22, 1883.

Witnesses.
J. H. Burridge
A. P. Stage

Inventor.
E. L. Liedke
W. H. Burridge
Atty

UNITED STATES PATENT OFFICE.

EDWARD L. LIEDKE, OF SANDUSKY, OHIO, ASSIGNOR OF ONE-HALF TO
FRANK L. FELCH, OF SAME PLACE.

BELT-JOINT.

SPECIFICATION forming part of Letters Patent No. 277,909, dated May 22, 1883.

Application filed February 9, 1883. (No model.)

*To all whom it may concern:*

Be it known that I, EDWARD L. LIEDKE, of Sandusky, in the county of Erie and State of Ohio, have invented a certain new and Improved Belt-Joint; and I do hereby declare that the following is a full, clear, and complete description thereof.

This invention relates to a belt-joint, the nature of which consists in making the two ends or sections of the belt fit or interlock into each other, to prevent lateral displacement of the joint, by having projections on one end of the belt, adapted to fit into corresponding recesses in the adjoining end, the two ends then being secured by lacing, or by other suitable means.

The invention will be fully understood on referring to the accompanying drawings, making a part of this specification, in which—

Figure 1:
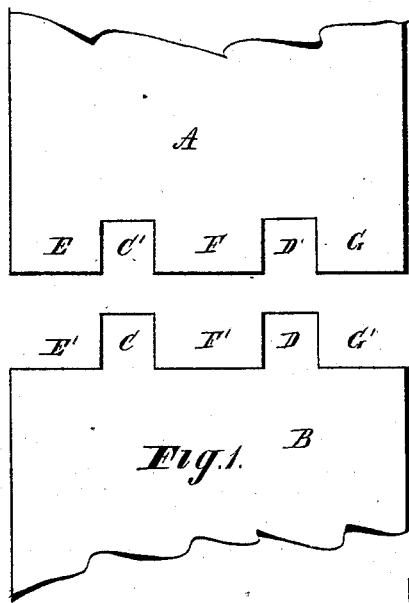
Figure 2:
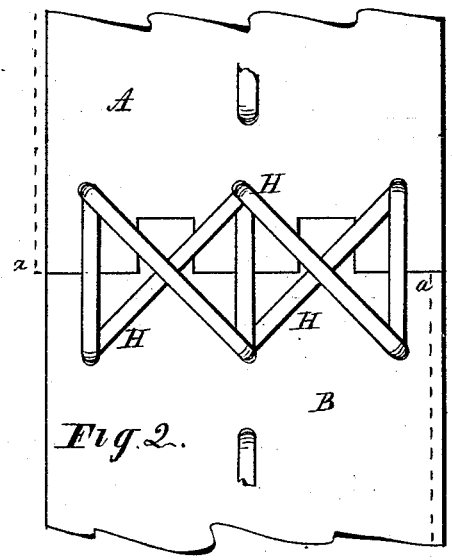
Figure 3:
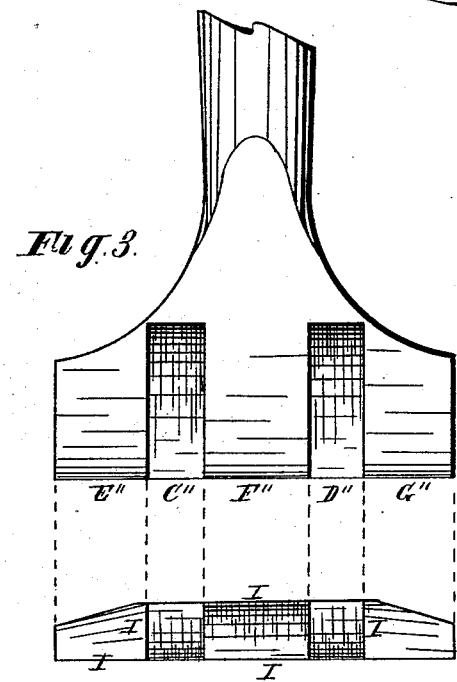

Figure 1 represents the two ends of a belt separated, and showing the projections and recesses for forming the interlocking union of the two parts. Fig. 2 shows the two ends of the belt united and secured by the lacing. Fig. 3 is a view of the tool by which the ends of the belt are formed for joining.

Like letters of reference refer to like parts in the several views.

It is well known that in the use of belts for driving machinery said belts soon become out of line along the edges—that is to say, one end of the belt projects laterally out from the other, forming a shoulder, which, when the belt is run, causes a stretching of the lacing and a frequent tearing out of the same from the holes in the belt, and a consequent more or less loss in belting material, time, and expense in repairing the same. Furthermore, when the joint of the belt is thus laterally out of line it causes much noise in striking against the shifter, or by running in contact with a tight or loose pulley—a source of much annoyance and interruption to the mechanism driven by the belt. To avoid these troubles, consequent upon a joint as usually made, is the object of this invention, of which the following is a detailed description.

A B in the drawings represent two opposite ends of a belt. The projections or extensions C D are made to fit into the recesses C' D', and the projections E, F, and G into the recesses E', F', and G', Fig. 1. The ends are punched and connected together, as shown, by lacing or its equivalent. The union of the two ends of the belt is shown in Fig. 2, the one being the counterpart of the other, and adapted to interlock, so as to prevent lateral displacement of the two ends in their relation to each other, and secured from longitudinal displacement by the lacing or by other suitable fastening.

It will be obvious that when the two ends of the belt are joined to each other, as above described, one end of the belt cannot move and project sidewise beyond the other, but must be continued in line along the edges of the belt, free of corners or shoulders, as indicated at *a*, Fig. 2, which corners occur in the ordinary belt-joint after the belt has been used but a short time, which strike the shifter, or against the sides of an opening for the passage of the belt, causing such strain upon the joint as to tear out the lacing.

By means of the improvement above described belt-joints are more durable, requiring less care and attention than joints of the usual kind.

The tool or cutter for forming the ends of the belt is shown in Fig. 3, in which I represents the line of the cutting-edge. This tool only is required to shape the ends for the joint, as the ends, when cut by the tool, will fit into each other. The parts C" D" E" and F" G" of the cutter give the shape E', C, D, and G' of the end B of the belt, which is in form the counterpart of E, C', F, D', and G in the end A of the belt. In this way the two ends of the belt are made to interlock, as shown in the drawings.

I am aware that belt-joints have been made by lapping and interlocking the ends thereof and securing the same by gluing, and that belt-fasteners have been used by riveting to the ends of the belt and interlocking the same to form a hinge-joint; but my improvement is essentially different from these in form and construction of the joint. The rectangular projections and corresponding recesses in the material of the belt prevent lateral stretching and drawing of the belt-edges aside from each other, as before stated. By the improvement there is less waste in cutting off the belt ends when it requires shortening, and in case of its being repaired, when torn out of the lacings, than in the ordinary belt-joint. The rectangular shape of the projections herein shown and described is preferred to other forms that may be used for the above-specified purpose.

What I claim as my invention, and desire to secure by Letters Patent, is—

The herein-described belt-joint, consisting of rectangular extensions C D, formed in the end of the belt material, and recesses C' and D' in the adjoining end of the belt material, arranged to interlock the belt together, in combination with the lacing or its equivalent, substantially as and for the purpose set forth.

In testimony whereof I affix my signature in presence of two witnesses.

EDWARD L. LIEDKE.

Witnesses:
W. H. BURRIDGE,
J. W. BURRIDGE.